April 30, 1957 W. A. GLOVER 2,790,803
TEMPERATURE CONTROL OF CHEMICAL REACTIONS AND APPARATUS
Filed Oct. 16, 1953 3 Sheets-Sheet 1

INVENTOR.
W. A. GLOVER
BY Hudson & Young
ATTORNEYS

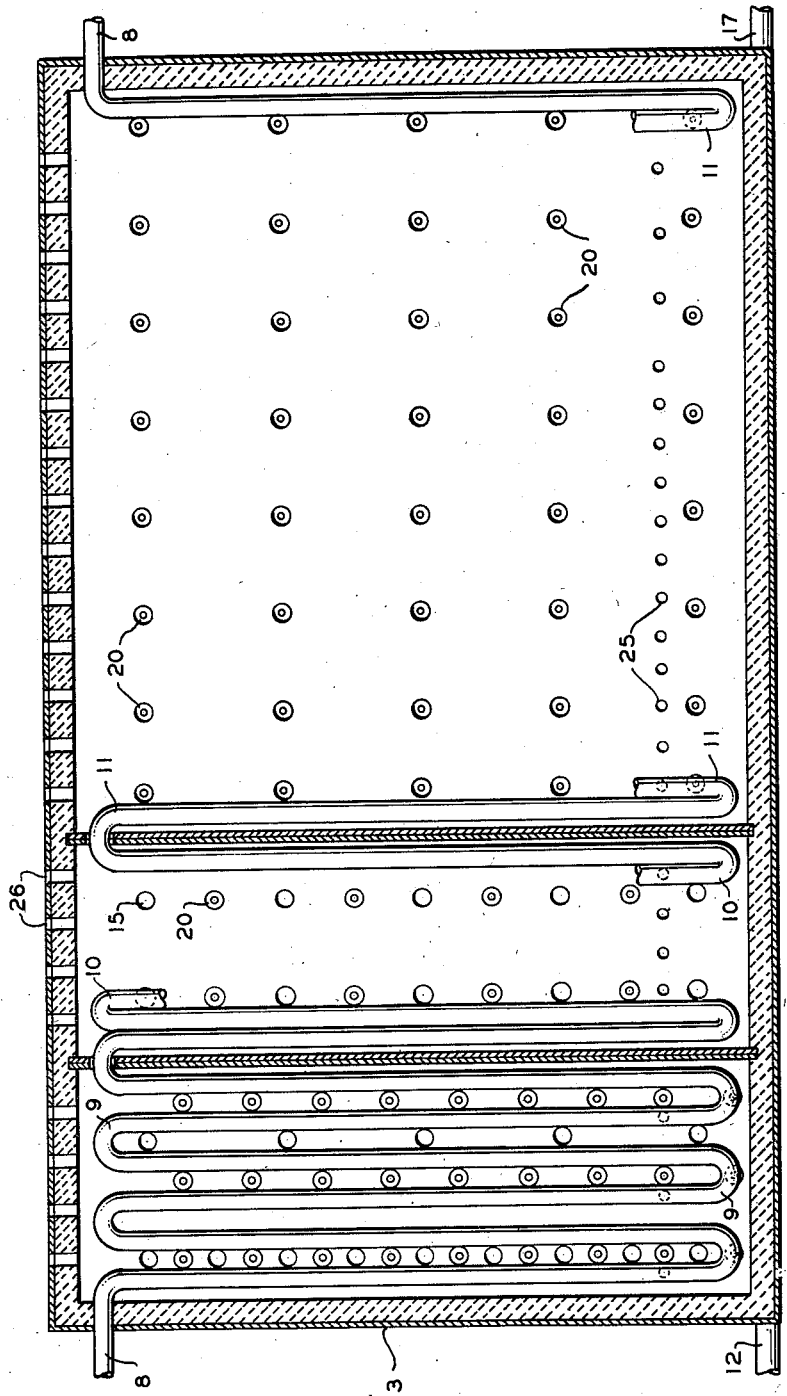

INVENTOR.
W. A. GLOVER

United States Patent Office 2,790,803
Patented Apr. 30, 1957

2,790,803

TEMPERATURE CONTROL OF CHEMICAL REACTIONS AND APPARATUS

Wayne A. Glover, Houston, Tex., assignor to Phillips Petroleum Company, a corporation of Delaware Application October 16, 1953, Serial No. 386,599

4 Claims. (Cl. 260—290)

This invention is directed to an improved process and apparatus for maintaining a constant temperature during a chemical reaction. More particularly, it relates to a process and apparatus for maintaining a constant temperature of about 500° F. during a continuous process for the production of methylethylpyridine from ammonia and paraldehyde.

One of the most recent developments in the field of nitrogen-petroleum chemicals is the production of synthetic pyridines on a commercial scale. One of the most important synthetic pyridines from the standpoint of quantity produced is 2-methyl-5-ethyl pyridine (MEP). It is manufactured from petroleum-derived acetaldehyde and ammonia. In the first step, acetaldehyde is polymerized to paraldehyde in the presence of a sulphuric acid catalyst according to the following reaction:

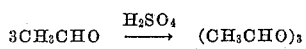

$$3CH_3CHO \xrightarrow{H_2SO_4} (CH_3CHO)_3$$

Makeup acetaldehyde and sulphuric acid are fed continuously into the polymerization reactor. The acid catalyst is neutralized and the paraldehyde is purified by fractionation prior to the MEP synthesis step.

In the second step, the paraldehyde is reacted with ammonia to form 2-methyl-5-ethyl pyridine (MEP) according to this reaction:

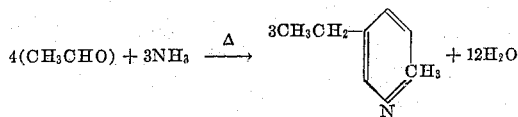

The condensation of the paraldehyde with aqueous ammonia is carried out at 450° to 550° F. and under sufficient pressure to maintain the reactants and products essentially in the liquid phase. Catalysts, which may be used alone or with a promoter, include ammonium acetate, ammonium chloride, ammonium bifluoride, boron trifluoride, and certain other fluorine-containing substances. In addition to MEP, some 2- and 4-picolines and higher boiling pyridines are produced. The chief uses for MEP are as intermediates in the manufacture of vinyl pyridines and nicotinic acid.

The principal object of the present invention is to provide a method and apparatus for maintaining a uniform temperature during the course of a chemical reaction. A more specific object is to provide a method and apparatus for maintaining a constant temperature during the synthesis of methylethylpyridine. More particularly, it is the object of the present invention to supply a method and apparatus whereby, during the synthesis of methylthylpyridine from acetaldehyde and ammonia, a uniform temperature of about 500° F. may be maintained throughout the reaction. An additional object is to provide a continuous process for the synthesis of methylethylpyridine.

During the course of many reactions, it is somewhat difficult to hold the temperature at the desired level throughout. Variations in the ambient temperature of the atmosphere may result in the necessity for adding heat at one time and withdrawing it at other times. In the case of an endothermic reaction, it is necessary to add heat in increasing amounts until the peak of the reaction is reached, after which a reduced supply of heat will be required to complete the reaction. In the case of an exothermic reaction, the temperature may rise rapidly as the reaction proceeds, reaching a peak and then declining. The addition of heat would be necessary in the earlier and later stages to initiate and complete the reaction, but heat would have to be withdrawn at the peak of the reaction to avoid overheating. The production of MEP from ammonia and paraldehyde is an exothermic type of reaction, usually requiring the addition of heat in the early and late stages and cooling during the height of the reaction. It is preferred practice to maintain the temperature during the reaction constant and at about 500° F. The reaction time should be about 15 minutes.

When using apparatus described in this invention, the feed at 2000 p. s. i. g. to the reactor is passed through a furnace wherein the temperature of the feed is rapidly raised to 500° F. After the feed is raised to 500° F., it passes to the reactor for a fifteen minute soaking period to complete the $NH_3$-paraldehyde reaction whereby MEP is formed. This reaction being exothermic, during the first part of the reaction it may be desirable to add heat during the periods of cooler atmospheric temperature and to add air for cooling during the periods of high atmospheric temperature to maintain a temperature of 500° F. and thereby reduce side reactions. As the reactants pass through the reactor, with most of the reaction occurring in the first part of the reactor, the reactants in the last part of the reactor may drop below the desired temperature unless heat is added.

By the practice of this invention, apparatus is used by which the temperature can be maintained extremely close to 500° F. throughout the reaction.

The operation of the invention may be understood by referring to the drawings in which:

Figure 3 shows a plan section of the reactor; and

Figure shows an end view of the reactor.

Figure 1:
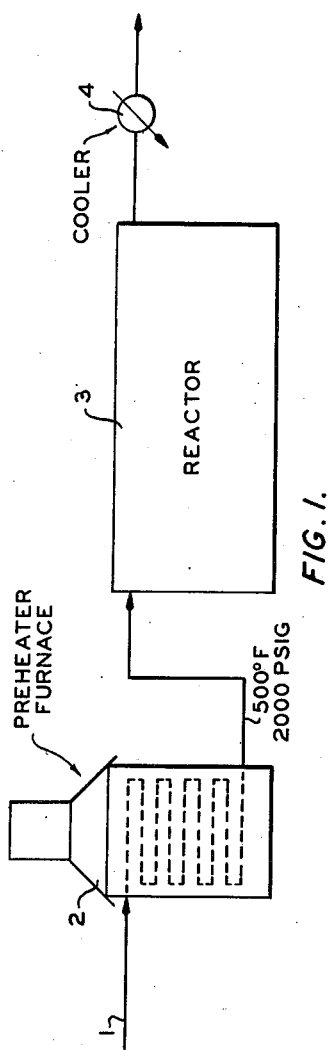
Figure 1 shows a preheater furnace, the reactor, and a cooler for the effluent reactor products.

The feed may be composed of about 21,000 parts by weight ammonia, 54,000 by weight water, and 20,000 parts by weight paraldehyde. Catalysts may also be used in the feed. Referring to Figure 1, the feed enters through line 1 into furnace 2 wherein the temperature is very suddenly increased to 500° F. The feed is passed into reactor 3 where the temperature is maintained at 500° F. The effluent from reactor 3 is passed through cooler 4.

Figure 2:
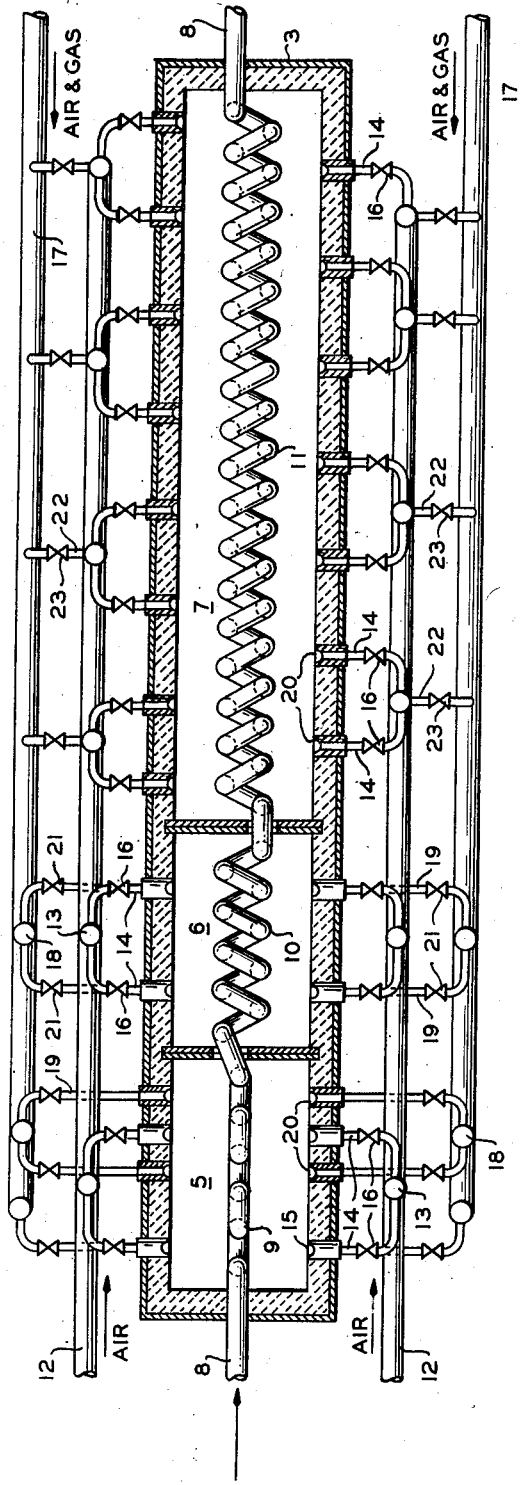
Figure 2 shows a longitudinal section of the reactor.

Figure 2 shows the reactor 3 divided into compartments 5, 6, and 7 for better temperature control since the reaction is slightly exothermic. The first compartment contains six tubes with 14 burners and 27 cooling ports on each side. The second compartment contains 10 tubes with 10 burners and 8 cooling ports on each side. The third and largest compartment has 50 tubes, 40 burners on one side, 45 burners on the other side, and no cooling ports. Cooling may be accomplished by forcing air through the burner ports.

Figure 4:
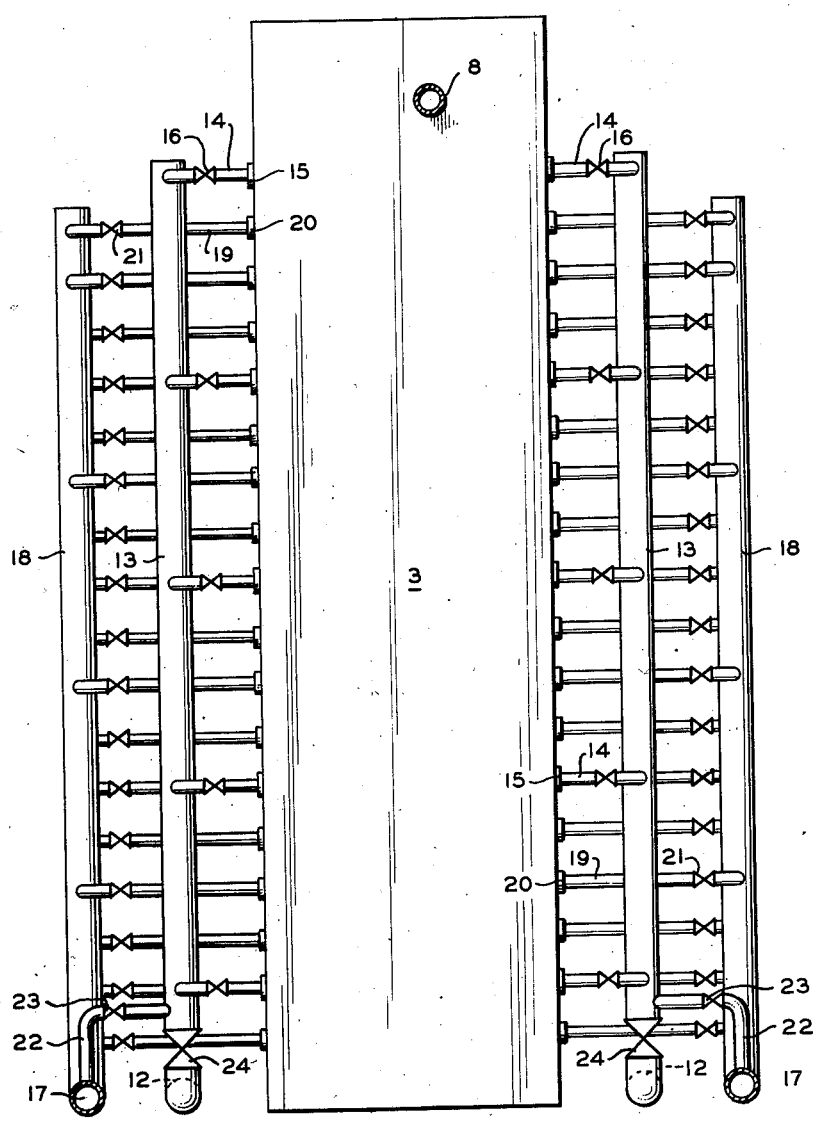

The feed enters the reactor through line 8 and passes through reactor tubes 9 and compartment 5. The feed passes from here into compartment 6 and through tubes 10. From compartment 6, the feed passes into compartment 7 and through tubes 11. All tubes are connected in series to form a continuous coil. In compartments 5 and 6, on both sides of the reactor, are located air ports 15. Line 12 is the air header. Air is withdrawn from 12 into vertical risers 13, each of which divides at a number of vertically spaced points into two inlet ducts 14 which open into zones 5 and 6 of the reactor through ports 15. The flow of air through ports 15 is controlled by valves 16. Fuel header 17 supplies an air-gas mixture to reaction zones 5 and 6 through vertical risers 18, each of which branches at a number of vertically spaced points into inlet conduits 19 opening into vertical ports 20 in the walls of reactor 3. The amount of gas burned in each of the ports 20 in zones 5 and 6 is regulated by individual valves 21 which control the flow of gas and air through each port. When atmospheric temperatures are high it may be desirable to feed air to compartment 5; when atmospheric temperatures are low it may be desirable to burn gas and air therein at ports 20 for controlling the temperature of the reaction in tube 9. Either heat or cooling air may be added to compartment 6 for controlling the temperature of reactants flowing through tube 10. In that portion of header 17 which parallels zone 7 of the reactor, header 17 is connected to conduits 22. These are valved at 23. Conduits 22 in turn connect into air risers 13, each of which divides into inlet ducts 14 as in compartments 5 and 6, which open into the reactor through burner ports 20. When the reactants have reached compartment 7 most of the reaction is complete and the heat of the reaction may not be enough to maintain the temperature of the reactor at 500° F. If this is the case, valve 24 (Figure 4) at the base of header 13 is closed to cut off the air from header 12 and valves 23 are opened. This admits gas and air through lines 22, risers 13, inlet conduits 14, and burner ports 20, and the mixture is burned within compartment 7. Individual valves 16 are used to equalize the rate of flow of gas and air passing through ports 20 in compartment 7. If cooling is desired then by closing the valves 23 in line 22 the air-gas stream in header 17 is cut off from risers 13, then on opening the valves 24 at the base of each riser 13 air will be admitted therethrough for cooling.

Thermocouples 25 (Figure 3) for temperature indication and strip recording are spaced horizontally along the reactor. A combustion controller automatically provides the correct gas-to-air ratio for varying gas requirements. Vents 26 are provided at the top of reactor 3 for the withdrawal of exhaust gases and air.

The apparatus described permits a continuous operation with a steady flow of feed and effluent. So far as is known, this synthesis has previously been carried out commercially only in batch reactors.

While a specific embodiment of the invention has been described, other embodiments may be apparent to those skilled in the art. It will be understood that the specific temperatures maintained in the several reaction zones, as well as pressure, space velocity, etc., will be adjusted according to the particular reaction involved and may be specifically varied without departing from the invention. The invention is not limited to a specific example, except as defined by the following claims.

I claim:

1. In a process for the production of methylethylpyridine from ammonia and paraldehyde wherein the reactants flow through a plurality of reaction zones in series, the improvement comprising maintaining the reaction temperature at about 500° F. in all zones by adding heat to the earlier zones of the series to bring the temperature up to about 500° F., withdrawing heat at the peak of the reaction to keep the temperature down to about 500° F., and again adding heat to the succeeding zones of the series to support their temperature at about 500° F.

2. In a process for maintaining a predetermined constant temperature level during the course of an exothermic chemical reaction wherein the reactants flow in heat exchange relationship through a series of zones to which heat exchange gas is admitted at a plurality of points, said gas being selected from the group consisting of hot combustion gases and coolant gases, the improvement comprising supplying to a plurality of said zones a sufficient amount of the appropriate heat exchange gas to maintain the temperature of the reactants at said predetermined constant temperature level, the selected gas being admitted to the zones at points separate from those points where the other heat exchange gas is admitted, and in the remaining zones admitting the appropriate heat exchange gas at the same point where the other heat exchange gas is admitted.

3. An apparatus for conducting a chemical reaction at a substantially uniform temperature comprising, in combination, an elongated shell divided into a plurality of substantially impervious chambers; conduit means for conducting the reactants through said chambers of said shell; means for injecting a cooling gas into said shell at a plurality of points along its length; means for injecting a heating gas into said shell at a plurality of points along its length; and separate outlet means in each of said chambers for withdrawing said gases.

4. An apparatus for reacting ammonia and paraldehyde to form methylethylpyridine comprising an elongated shell divided into a plurality of substantially impervious chambers and conduit means for conducting the reactants through said chambers, in combination with a heat exchange system comprising means for injecting a cooling gas into said shell at a plurality of points along its length, means for injecting a heating gas into said shell at a plurality of points along its length; means permitting the addition of either cooling gas or heating gas to the same injection point in at least one portion of said shell; and separate outlet means in each of said chambers for withdrawing said gases.

References Cited in the file of this patent

UNITED STATES PATENTS

| | | |
|---|---|---|
| 2,118,728 | Harris et al. | May 24, 1938 |
| 2,574,088 | Charlton | Nov. 6, 1951 |
| 2,605,264 | Hoog et al. | July 29, 1952 |
| 2,615,022 | Mahan | Oct. 21, 1952 |
| 2,645,566 | Stookey | July 14, 1953 |
| 2,653,859 | Glaeser | Sept. 29, 1953 |
| 2,700,042 | Aries | Jan. 18, 1955 |